United States Patent [19]

Brammall

[11] Patent Number: 4,681,356
[45] Date of Patent: Jul. 21, 1987

[54] CONICAL CABLE LOCK

[75] Inventor: Terrence N. Brammall, Angola, Ind.

[73] Assignee: Trans-Guard Industries, Inc., Angola, Ind.

[21] Appl. No.: 772,191

[22] Filed: Sep. 3, 1985

Related U.S. Application Data

[63] Continuation of Ser. No. 490,341, May 2, 1983, abandoned.

[51] Int. Cl.⁴ ............................................. B65D 33/34
[52] U.S. Cl. .................... 292/327; 24/115 G; 24/127
[58] Field of Search ............ 24/136 A, 136 R, 115 G, 24/115 L, 127; 339/255 L, 273 S, 270 S, 248 S; 292/239, 327, 252, 307 R, DIG. 7, DIG. 10, 319, 320, 323

[56] References Cited

U.S. PATENT DOCUMENTS

| | | | |
|---|---|---|---|
| 1,832,388 | 11/1931 | Heisser | 24/136 A |
| 3,770,307 | 11/1973 | Van Gompel | 292/307 R |
| 3,994,521 | 11/1976 | Van Gompel | 292/319 |
| 3,998,167 | 12/1976 | Van Gompel | 105/477 |
| 4,049,303 | 9/1977 | Irwin et al. | 292/307 R |
| 4,074,916 | 2/1978 | Schindler | 292/307 R |
| 4,141,117 | 2/1979 | Van Gompel | 24/136 A |

FOREIGN PATENT DOCUMENTS 196185  2/1958  Austria ............................. 24/115 L Primary Examiner—Richard E. Moore
Attorney, Agent, or Firm—Carella, Byrne, Bain & Gilfillan

[57] ABSTRACT

A lock slidable in one direction over a cable, while locking against motion in the opposite direction over the cable. The lock includes a lock body having an axial opening with the cable receivable therethrough, the body further defining three slots radiating outwardly from the opening with each of the slots having an outer wall tapered in the same direction. A disk is provided in each of the slots and is biased toward the direction of the taper of the slot outer wall. The outer periphery of each of the disks is beveled and/or has threads winding around the periphery.

6 Claims, 6 Drawing Figures

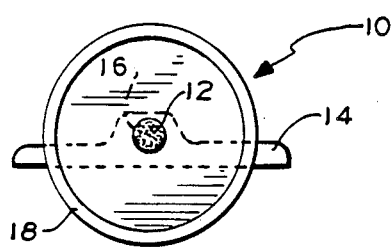
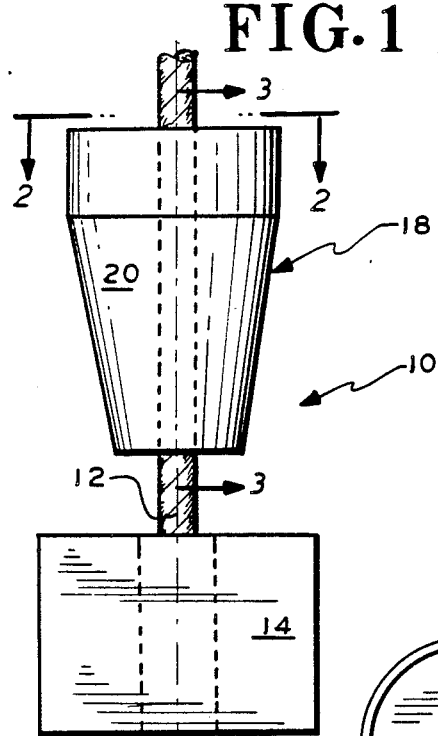
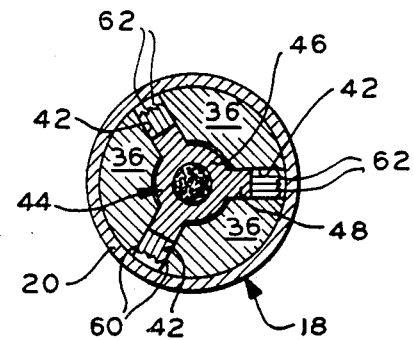
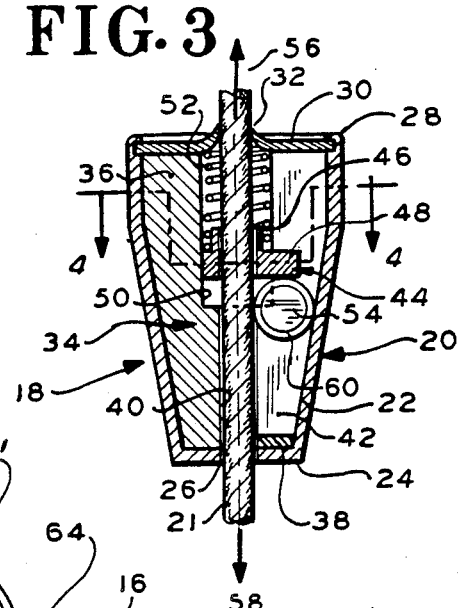
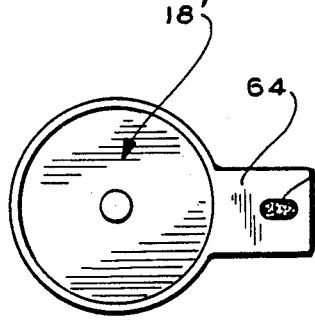
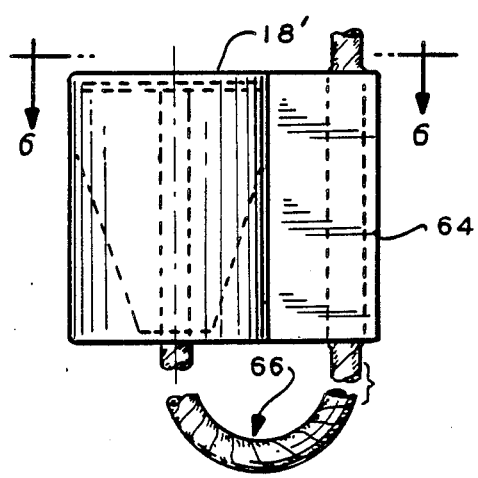

CONICAL CABLE LOCK

This application is a continuation of application Ser. No. 490,341, filed May 2, 1983, now abandoned.

BACKGROUND OF THE INVENTION

1. Field of the Invention

This invention relates generally to locks and in particular to a lock utilizing a line or cable.

2. Description of the Prior Art

Locking devices having an opening into which a cable is inserted and which grip the cable to prevent retraction from the device in the direction opposite its insertion are known in the art. Such locking devices have generally used a wedging action to secure the cable within the device.

One type of locking device are conical locks. Conical locks generally use three balls carried by a retainer within a conical shell. A cable may be inserted through the balls and retraction of the cable from the device is thereafter prevented by the squeezing of the balls onto the cable as they are wedged by the conical shell. Locks of this type are shown in, for example, U.S. Pat. No. 3,994,521.

Such locks prevent the direct retraction of a cable locked therein. However, since in most uses the cable involved has spirally wound strands, releasing the locking device by twisting it around the cable is a major problem which has been recognized in the prior art. The cone lock disclosed in U.S. Pat. No. 3,994,521 uses a conical tapered opening which is formed into a generally triangular shape, which shape, though aiding in preventing rotation of the balls and thus twisting of the cable within the locking device, is difficult and expensive to manufacture.

Further, since the balls of prior cone locks are completely retained in a unitary retainer, the locks can be picked by manipulation solely of the retainer (i.e. by moving it away from the cone taper).

The present invention is directed toward overcoming one or more of the problems as set forth above.

SUMMARY OF THE INVENTION

In one aspect of the present invention, a lock for a cable is provided, in which the lock is slidable in one direction over the cable, while locking against motion in the opposite direction over the cable. The lock includes a lock body having an axial opening with the cable receivable therethrough, the body further defining three slots radiating outwardly from the opening with each of the slots having an outer wall tapered in the same direction. A disk is provided in each of the slots and is biased toward the direction of the taper of the slot outer wall. The outer periphery of each of the disks is beveled and/or has threads or grooves around the periphery.

With the present invention, secure locking is provided on the cable not only against axial forces but also against rotational forces which in the prior art would cause the lock body to twist off the cable. In particular, the disks will not rotate sideways as can occur with the balls, thereby effectively preventing the rotation of the lock body around the cable. Still further, the provision of a bevel concentrates the locking forces and the provision of threads around the edge of the disks provides a strong frictional locking force between the disks and the cable, both helping to prevent rotation of the cable with respect to the cone lock.

The present invention also greatly improves the security of the cone lock by requiring the simultaneous manipulation of the multiple independent components (i.e. each disk) in order to pick the lock, a task which is so difficult as to be virtually impossible.

Still further, the lock body disclosed may be inexpensively manufactured, significantly reducing the cost involved in using such locks.

BRIEF DESCRIPTION OF THE DRAWINGS

FIG. 1 is a view of a cable lock including a conical locking device;

FIG. 2 is a view taken along line 2—2 of FIG. 1;

FIG. 3 is a cross-sectional view taken along line 3—3 of FIG. 1;

FIG. 4 is a cross-sectional view taken along line 4—4 of FIG. 3;

FIG. 5 is a view of an alternative embodiment of the present locking device; and FIG. 6 is a view taken along line 6—6 of FIG. 5.

DESCRIPTION OF THE PREFERRED EMBODIMENT

The cable locking device 10 is shown in FIGS. 1 and 2. One end of a line or cable 12 is permanently fixed to a flag 14 in any suitable manner, as by inserting it into a hole 16 in the flag and then swaging the flag 14, deforming the flag hole 16 to secure the cable 12 therein.

In typical use, the opposite end of the cable 12 is extended through openings in the object or objects to be locked and then the lock body 18 is slid over the cable 12 to lock the objects between the flag 14 and the lock body 18. One example is to lock a door by locking together brackets on the door and its frame (not shown). The flag and lock body 18 are larger than the holes in the brackets through which the cable 12 extends, so that the two brackets are locked between the flag 14 and lock body 18. As will be apparent, the lock body 18 will freely slide over the cable 12 toward the flag 14 but locks against being retracted back over the cable 12.

The lock body 18 is shown in detail in FIGS. 3 and 4. It includes a shell 20 of suitable material such as aluminum. The shell 20 is cylindrical and includes a portion 22 which is generally conical in shape tapered toward a narrow end 24. The narrow end 24 includes an opening 26 through which the cable 12 may pass. The wide end 28 of the shell 20 is open to permit assembly of the components therein. The shell 20 can be a deep draw or a machined part and, being cylindrical, is inexpensive to manufacture.

An end cap 30 is provided which may be permanently secured to the shell 20 in any suitable manner once the interior components (to be described below) are assembled within the shell 20. The cap 30 also includes an opening 32 through which the cable 12 may pass. The cap opening 32 has a slight funnel shape to guide the end of the cable 12 when first inserted through the lock body 18.

Within the shell 20 is a filler body 34 having three leg segments 36 interconnected at the narrow end 24 by a washer-shaped segment 38. The filler body 34 basically conforms to the interior shape of the shell 20 and has an axial opening 40 connecting the shell and cap openings 26,32. The three leg segments 36 also define between one another axial slots 42 which radiate outwardly from the axial opening 40 (see FIG. 4). The filler body 34 may be made of hand plastic and thus also is inexpensive to manufacture.

A pusher 44 having a central tubular portion 46 with three outwardly radiating legs 48 is located within the slots 42 and an enlarged portion 50 of the axial opening 40 defined by the filler body 34. A compression spring 52 is located between the pusher 44 and end cap 30 to bias the pusher 44 toward the narrow end 24 of the lock body 18.

Disks 54 are positioned within each of the three slots 42 between the narrow end 24 by the pusher legs 48. The disks 54 have a diameter greater than the difference between the cable radius and the smallest radius of the conical portion 20.

As can be seen, the cable 12 may be freely pushed through the lock body 18 in the direction of arrow 56 since doing so pushes the disks 54 toward the large end of the shell conical portion 22. However, when the cable 12 is pulled in the opposite direction (arrow 58), the disks 54 are pulled toward the taper of the shell 20 and the shell walls thus force the disks 54 together, squeezing the cable 12 therebetween to lock it against being pulled through the lock body 18.

The sides 60 are beveled or tapered around the periphery of the disks 54. This provides a particularly strong locking action by focusing the squeezing forces of the disks 54 across a smaller area, enabling the disks 54 to press into the cable 12 sufficiently to deform and thus grip its surface.

Still further in the preferred embodiment, the disks have threads or grooves 62 around the surface between the tapered sides 60. These threads 62 grip the cable 12, locking it against rotation within the lock body 18 since the threads 62 are axially aligned.

An alternative embodiment is shown in FIGS. 5 and 6. The lock body 18' functions as described above and is formed unitarily with a flange 64 acting as a flag. With this embodiment, the cable 12' may be locked to form a loop 66.

As can be seen, any one of the three disks 54 can lock the cable 12 since the cable 12 is squeezed between the disk 54 and the filler body leg segment 36 opposite the particular disk. It is thus virtually impossible to pick this locking device 10 since all three independent disks 54 must be manipulated simultaneously in order to release the cable 12 from the lock body 18.

Accordingly, with the present invention the cone lock for the cable is extremely secure, not only against being pulled off by axial forces, but also against being twisted off. This is particulary important in common uses where the cable consists of wire strands and has a spiral texture surface. Other aspects, objects and advantages of the invention will become apparent from a study of the drawings, the disclosure and the appended claims.

I claim:

1. A lock for a line, said lock being of the type that is slidable in a first direction onto said line but locks against motion over the line in the opposite direction, comprising
    a lock body having an axial opening with said line receivable therethrough, said body further defining three slots radiating outwardly from said opening, each slot having an outer wall inclined inwardly toward the opening in said first direction;
    three disks, one disk in each of said slots, each of said disks having a bevelled outed periphery;
    said disks each having threads around the outer periphery;
    and means for biasing said disks toward said first direction in said slots.

2. A lock for a line, said lock being slidable in a first direction onto said line, while locking against motion over the line in a second direction opposite said first direction, comprising:
    a lock body having an axial opening with said line receivable therethrough, said body further defining three slots radiating outwardly from said opening, each slot having an outer wall tapered toward the opening in said first direction;
    three disks, one disk in each of said slots, each of said disks having a threaded outer periphery;
    means for biasing said disks toward said first direction in said slots.

3. A lock comprising:
    a line;
    a flag member secured to said line;
    a locking shell formed with an axial opening with said line receivable therethrough in a first direction, said shell further defining a generally conical chamber concentric with said opening and tapered in a second direction opposite said first direction;
    a filler body within said chamber having portions defining an axial opening therethrough and further defining three axially aligned slots, each of said slots radiating outwardly from the opening opposite an associated filler body portion;
    three disks, one disk in each of said slots; and
    means for biasing said disks toward said second direction in said slots;

4. A lock designed for use with an elongated member cable of predetermined diameter, said lock being of the type which is slidable in one direction onto said elongated member and locks against motion in the opposite direction, said lock comprising a lock housing having an opening at top and bottom ends thereof and having three internal longitudinally extending sets of walls forming longitudinally extending slots radially spaced from the axis of said openings and equally spaced around said opening axis, an outer wall associated with each slot which is inclined inwardly toward the opening at the bottom of said body, a locking member in each of said slots, each locking member being longitudinally movable in the slot in which it is positioned independently of the other locking members, and means at the upper end of the slots for resiliently biasing each locking member to a position in the slot at which the surface of the locking member engages the surface of an elongated member of said predetermined diameter inserted therein.

5. A lock as set out in claim 4 in which said locking elements are disks having a peripheral surface with means thereon for frictional engagement with said elongated member.

6. A lock as set out in claim 5 in which the peripheral surface of said disks is narrower than the predetermined diameter of the elongated member with which it is designed for use.

* * * * *